United States Patent [19]
Bumbarger

[11] Patent Number: 5,313,619
[45] Date of Patent: * May 17, 1994

[54] EXTERNAL CLOCK UNIT FOR A COMPUTER

[75] Inventor: Daniel L. Bumbarger, Hudson, Mass.

[73] Assignee: Gerard J. Severance, Southborough, Mass.

[*] Notice: The portion of the term of this patent subsequent to Jul. 28, 2009 has been disclaimed.

[21] Appl. No.: 701,213

[22] Filed: May 16, 1991

[51] Int. Cl.$^5$ ............................................. G06F 1/04
[52] U.S. Cl. ................................ 395/550; 364/200; 364/DIG. 1; 364/DIG. 2; 364/270; 364/270.1; 364/934
[58] Field of Search ............... 395/550, 150, 151, 164, 395/165, 166; 364/200, 270, 270.1

[56] References Cited

U.S. PATENT DOCUMENTS

| | | | |
|---|---|---|---|
| 4,435,757 | 3/1984 | Pross, Jr. ........................... | 395/550 |
| 4,463,440 | 7/1984 | Nishiura et al. ................... | 395/550 |
| 4,644,484 | 2/1987 | Flynn et al. ....................... | 364/200 |
| 4,819,164 | 4/1989 | Branson ............................. | 395/550 |
| 4,823,262 | 4/1989 | Calle .................................. | 395/550 |
| 4,968,899 | 11/1990 | Katsutani et al. ................. | 307/269 |
| 5,134,703 | 7/1992 | Bumbarger ....................... | 395/550 |
| 5,155,841 | 10/1992 | Bumbarger ....................... | 395/550 |

*Primary Examiner*—Dale M. Shaw
*Assistant Examiner*—Sang H. Kim
*Attorney, Agent, or Firm*—Kriegsman & Kriegsman

[57] ABSTRACT

An external clock unit for use with a DEC 6000 series computer for increasing the clock cycle time includes an oscillator for generating a clock signal which is faster than the clock signal produced by the oscillator in the CPU module in the computer, a line driver for driving the clock signal outputted by the oscillator in the clock unit, a manually operable switch for outputting a control signal and a power supply for providing power to the various components in the clock. In use, the external clock unit is connected to the clock distribution chip in the CPU module in the computer using pins normally used only for test purposes during fabrication. When the switch is turned on, the clock from the oscillator in the computer CPU module is disabled and the clock signal from the clock which is received by the clock distribution chip is used as the clock signal for the computer.

8 Claims, 3 Drawing Sheets

EXTERNAL CLOCK UNIT FOR A COMPUTER

BACKGROUND OF THE INVENTION

The present invention relates generally to a computer and more particularly to an external clock unit for use with a computer.

Digital Equipment Corporation (DEC) 6000 series computers are one type of many well known and widely used types of computers. A DEC 6000 series computer generally contains one or more central processing unit (CPU) modules, the particular number of CPU modules present in the computer depending on the particular model 6000 series computer. Each CPU module includes, in addition to a CPU, an oscillator which outputs a clock signal which sets the timing (i.e. operating speed) of the computer and a clock signal distribution chip. In the operation of the CPU module, a clock signal from the oscillator is fed into the clock signal distribution chip which distributes the clock signal where needed within the CPU module. The particular frequency of the clock signal obtained from the oscillator is dependent on the particular oscillator used in the DEC 6000 series CPU module. In one such CPU module the oscillator outputs a clock signal frequency of about 50 MHZ while in another CPU module the oscillator outputs a clock signal frequency of about 67 MHZ.

It would be desirable to be able to easily change the operating speed of a DEC 6000 series computer and more particularly to easily increase the operating speed of a DEC 6000 series computer.

Accordingly, it is an object of this invention to provide a new and improved method and apparatus for increasing the operating speed of a DEC 6000 series computer.

It is another object of this invention to provide a new and improved method and apparatus for increasing the operating speed of a DEC 6000 series computer without physically replacing the existing oscillator in the CPU module or making any other hardware changes within the computer.

It is a further object of this invention to provide a clock unit for a computer which is constructed such that it can be arranged to emit either one of two predetermined clock signals.

SUMMARY OF THE INVENTION

According to this invention, the operating speed of a DEC 6000 series computer is increased through the use of an external clock unit. The external clock unit is connected to the clock signal distribution chip in the CP module using two pins on the chip that are normally used only for test purposes during fabrication. The external clock unit is constructed so as to produce a clock signal which is faster (i.e. higher) than the clock signal which is produced by the oscillator in the CPU module. The external clock unit includes a power supply, an oscillator, a driver and a manually operable on-off switch. When the switch is in the "on" position, a control signal is sent to the clock signal distribution chip to enable the clock signal from the external clock unit and disable the clock signal from the oscillator on the CPU module. When the switch is in the off position, there is no enable signal and the CPU module operates using the oscillator that is on the CPU module.

Various features and advantages will appear from the description to follow. In the description, reference is made to the accompanying drawings which form a part thereof, and in which is shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

Figure 1:
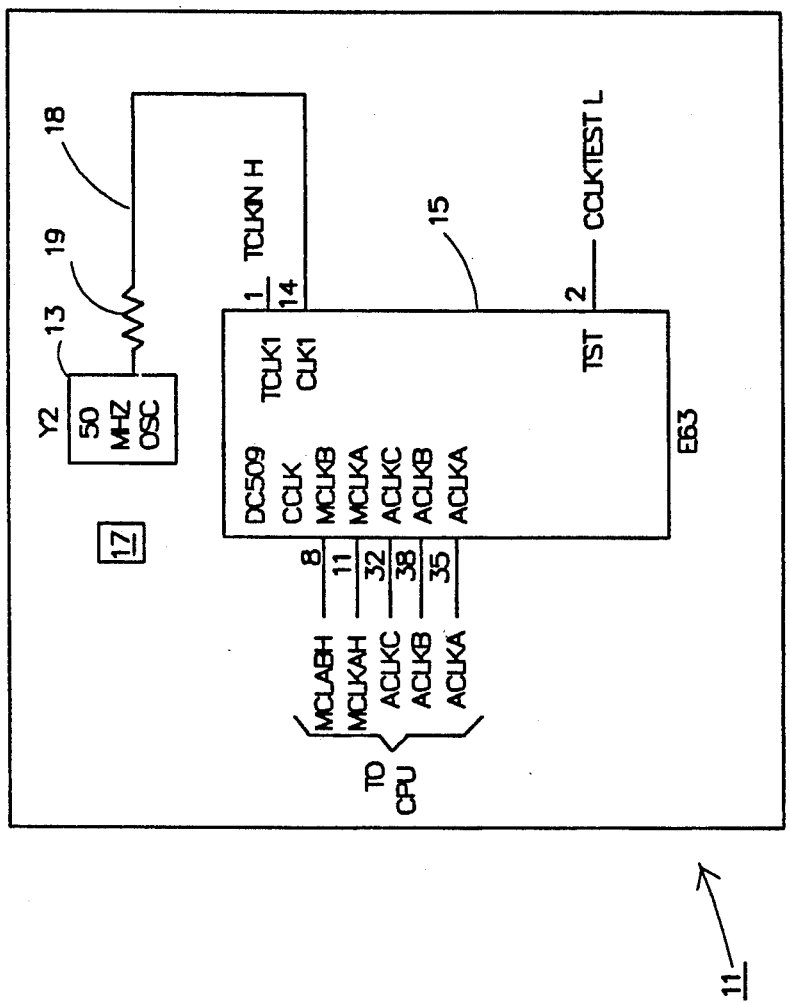
FIG. 1 is a simplified schematic diagram of the CPU module in one type of DEC 6000 series computer.

Referring now to the drawings, there is shown in FIG. 1a simplified schematic diagram of a CPU module in one type of DEC 6000 series computer, the CPU module being Identified by reference numeral 11. Parts of module 11 not pertinent to the invention are not shown.

Module 11 includes a 50 MHZ crystal oscillator 13, a clock signal distribution chip 15 and a capacitor 17. Oscillator 13 is used to generate the clock signals for CPU module 11. Chip 15 is in the form of a gate array. The output of oscillator 13 is connected by line 18 to pin 44 in chip is through a resistor 19. Capacitor 17 is coupled to an unregulated +5 volts obtained from a supply (not shown).

In the normal operation of CPU module 11, the clock signal from oscillator 13 is fed into chip 15 where it is distributed throughout the module as needed.

Figure 2:
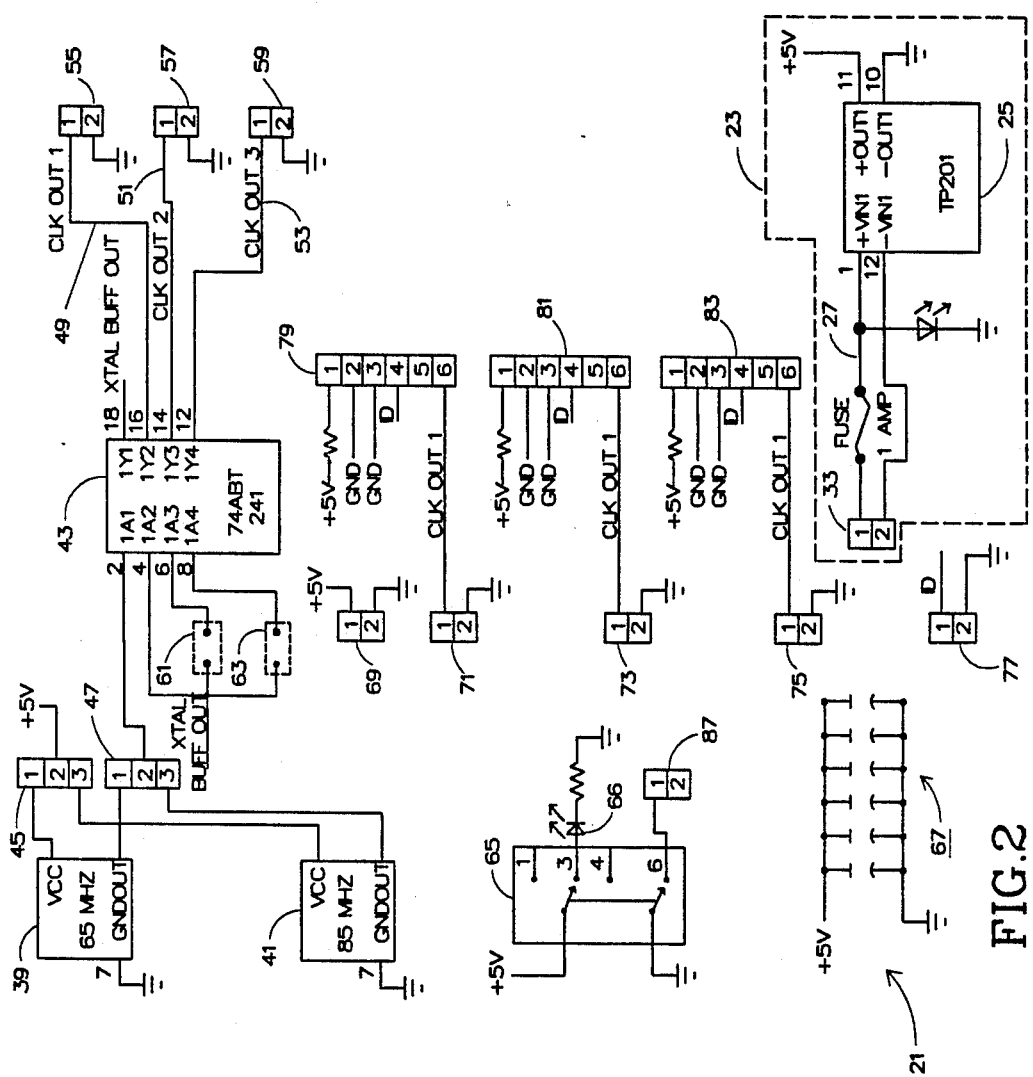
FIG. 2 is a schematic diagram of an external clock unit constructed according to the teachings of this invention for increasing the operating speed of a DEC 6000 series computer.

Referring now to FIG. 2 there is shown a schematic diagram of an external clock unit constructed according to the teachings of this invention which may be used for increasing the operating speed of a DEC 6000 series computer, the external clock unit being identified by reference numeral 21.

Clock unit 21 includes a power supply 23 which provides the necessary power for operating external clock unit 21. Power supply 23 includes a DC to DC converter 25 which receives an unregulated +5 volts DC from CPU module 11 over line 27 and outputs a regulated +5 volts over a line 29. Line 27 includes a one amp fuse 31. Line 27 is connected at its input end to pin 1 of a two pin connector 33. An LED 35 is coupled by a line 37 to line 27 and serves to indicate if the unregulated +5 volts is being received over line 27.

Clock unit 21 further includes a 65 MHZ crystal oscillator 39, an 85 MHZ crystal oscillator 41 and a driver 43.

The input of oscillator 39 is connected to pin 1 of a three pin jumper 45 and the input of oscillator 41 is connected to pin 3 of Jumper 45. Pin 2 of jumper 45 is connected to the regulated +5 volts. The output of oscillator 39 is connected to pin 1 of a three pin jumper 47 and the output of oscillator 41 is connected to pin 3 of jumper 47. Pin 2 of jumper 47 is connected to driver 43. As can be appreciated, jumper 45 is used to determine which oscillator will receive an input voltage and jumper 45 is used to determine which oscillator is coupled to driver 43.

Thus, driver 43 will receive either a 65 MHZ signal from oscillator 39 or an 85 MHZ signal from oscillator 41, depending on how the jumpers are jumpered.

Driver 43 has three clock output lines numbered 49, 51 and 53. Line 49 is connected to pin 1 of a two pin connector 55, line 51 is connected to pin 1 of a two pin connector 57 and line 53 is connected to pin 1 of a two pin connector 59. A pair of two pin jumpers 61 and 63 are also connected to driver 43. When neither jumper 61 nor jumper 63 are jumpered there is an output on only line 49. When jumper 61 is jumpered there are outputs on lines 49 and 51 and when jumpers 61 and 63 are jumpered there are outputs on lines 49, 51 and 53. Thus, clock unit 21 can provide from one to three clock signal outputs and can thus serve a computer having up to three CPU modules.

Clock unit 21 further includes a manually operable on-off switch 65, a bank of capacitors 67 and a group of connectors 69 through 83.

A LED 66 is coupled to switch 65 to indicate when switch 65 is in the "on" position. When switch 65 is in the "on" position a control signal which is used as an external clock enable signal is outputted from connector 87 to connector 77 to enable the clock signal from clock unit 21 and disable the clock signal from oscillator 13. When switch 65 is in the "off" position there is no enable signal emitted from switch 65 and CPU 11 operates using the signal from oscillator 13.

Capacitors 67 are used for eliminating noise, one capacitor being connected to each component.

Connectors 55, 57 and 59 are adapted to be connected to connectors 71, 73 and 75 respectively. Connector 77 is adapted to be connected to pins (3 and 4) in each of connectors 79, 81 and 83. Connector 69 is adapted to be connected to connector 33 which in turn is connected to (pins 1 and 2) in each of connectors 79, 81 and 83. Connectors 79, 81 and 83 are used to connect unit 21 to connectors on cables adapted to be connected to CPU modules.

Figure 3:
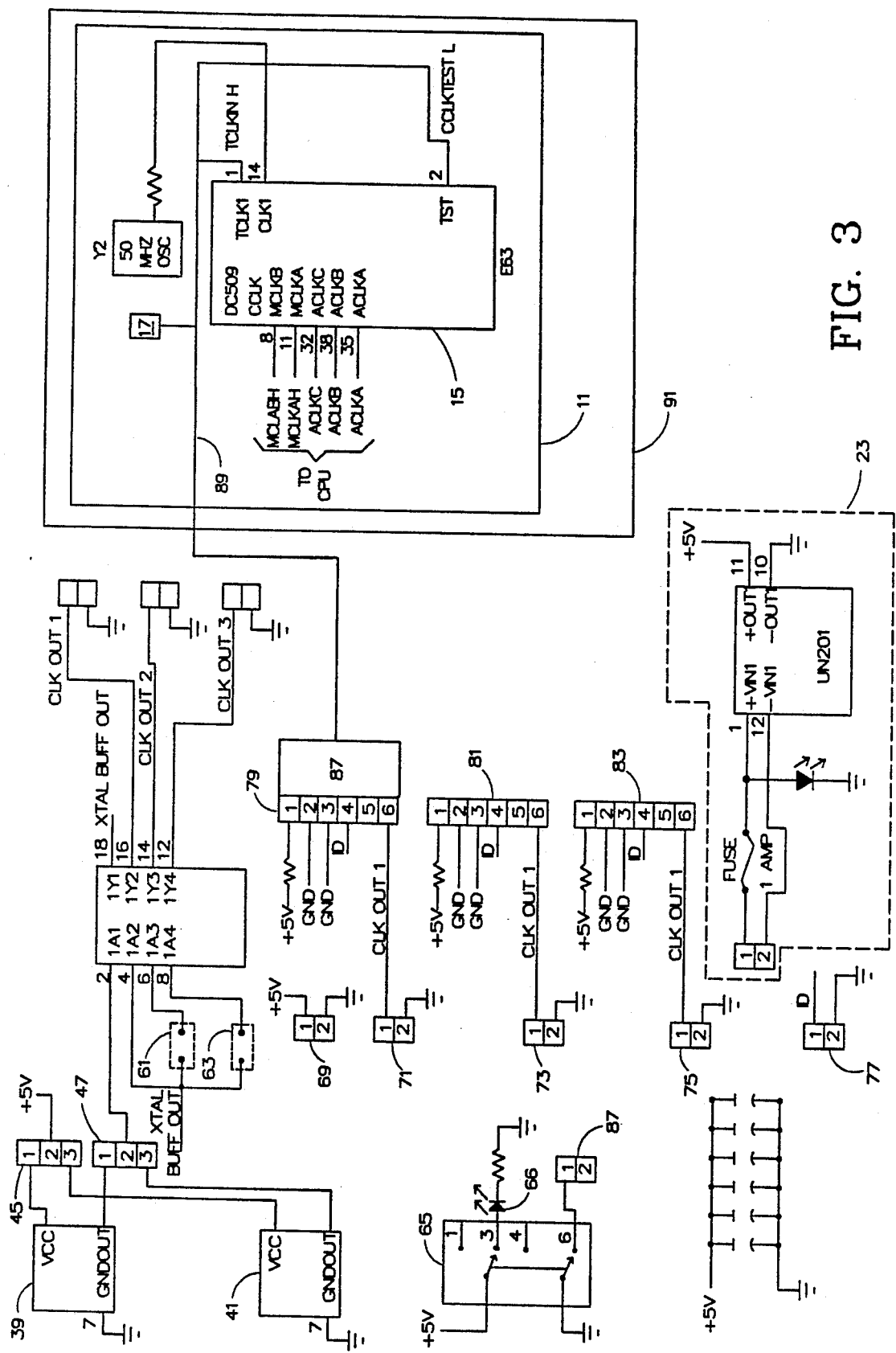
FIG. 3 is a diagram showing how the external clock unit shown in FIG. 2 is operatively connected to the CPU module shown in FIG. 1.

Referring now to FIG. 3 there is shown a schematic diagram illustrating how external clock unit 21 is connected to a computer 91 having one CPU module 11. As can be seen, connector 79 is connected to a connector 93 which is attached by a cable 95 to pins 1 and 2 in chip 15. As can also be seen, neither jumper 61 nor jumper 63 are jumpered since there is only one CPU module in computer 91.

The embodiments of the present invention is intended to be merely exemplary and those skilled In the art shall be able to make numerous variations and modifications to it without departing from the spirit of the present invention. For example, if the CPU module with which the clock unit is to be used has a 148 MHZ oscillator, then one of the crystal oscillators, such as the 65 MHZ crystal oscillator, will be replaced with a 185 MHZ crystal oscillator and then used to provide the clock signal. All such variations and modifications are intended to be within the scope of the present invention as defined in the appended claims.

What is claimed is:

1. A clock unit for attachment to a DEC 6000 computer, said DEC 6000 computer having a CPU module, said CPU module including a clock distribution device and an oscillator, said oscillator being coupled to said clock distribution device and providing a first clock signal to said clock distribution device, said clock unit being attached to said clock distribution device comprising:
   a. means for generating a second clock signal,
   b. means for driving the second clock signal,
   c. manually operated switch means for generating a control signal for disabling said first clock signal and enabling said second clock signal, and
   d. a power supply for providing power to said clock unit.

2. The clock of claim 1, wherein the means for generating said second clock signal comprises an oscillator.

3. The clock of claim 2, wherein the means for driving said second clock signal has a plurality of outputs.

4. In a DEC 6000 series computer having a CPU module which includes a clock signal distribution device and an oscillator for outputting a first clock signal, said oscillator outputting said first clock signal being coupled to said clock signal distribution device, the improvement comprising a clock unit coupled to said clock signal distribution device for providing a second clock signal for use in place of the first clock signal, said clock unit including an oscillator, a power supply and a manually operated switch.

5. The computer of claim 4, wherein said clock unit further includes a line driver coupled to said oscillator in said clock unit for driving the second clock signal outputted by the oscillator in said clock unit.

6. The computer of claim 5 wherein said clock unit further includes a manually operated switch for outputting a control signal.

7. A computer system comprising:
   a. a DEC 6000 computer, said DEC 6000 computer including a CPU module having:
      i. a clock distribution chip,
      ii. an oscillator connected to said clock distribution chip for providing first clock signals to said clock distribution chips,
   b. a clock unit attached to said CPU module, said clock unit including:
      i. an oscillator for generating a second clock signal,
      ii. means for driving the second clock signal outputted by said oscillator in said clock unit,
      iii. means connecting said driving means to said clock distribution chip in said DEC 6000 computer,
      iv. manually operated means coupled to said clock distribution chip for generating a control signal for selectively enabling said second clock signals from said oscillator in said clock unit and disabling said first clock signal, from said oscillator in said CPU module, and
      v. a power supply for providing power to said clock unit.

8. The computer system of claim 7 wherein said clock unit is coupled to pins 1 and 2 in said clock distribution device in said CPU module.

* * * * *